United States Patent
Vaidya et al.

(10) Patent No.: US 10,320,197 B2
(45) Date of Patent: Jun. 11, 2019

(54) APPARATUS AND METHOD FOR REDUCED ENERGY RETENTION IN AN ENERGY TRANSFER SYSTEM

(71) Applicant: Intel Corporation, Santa Clara, CA (US)

(72) Inventors: Vaibhav Vaidya, Portland, OR (US); Lilly Huang, Portland, OR (US); Christopher Schaef, Lebanon, NH (US)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 14/926,975

(22) Filed: Oct. 29, 2015

(65) Prior Publication Data

US 2017/0126013 A1    May 4, 2017

(51) Int. Cl.
| | |
|---|---|
| *H01H 47/00* | (2006.01) |
| *H02J 4/00* | (2006.01) |
| *H02J 7/00* | (2006.01) |
| *H02J 7/34* | (2006.01) |
| *H02J 7/35* | (2006.01) |

(52) U.S. Cl.
CPC ............. *H02J 4/00* (2013.01); *H02J 7/0055* (2013.01); *H02J 7/34* (2013.01); *H02J 7/345* (2013.01); *H02J 7/35* (2013.01)

(58) Field of Classification Search
USPC ........................................................ 307/126
See application file for complete search history.

(56) References Cited

U.S. PATENT DOCUMENTS

| | | |
|---|---|---|
| 5,555,165 A | 9/1996 | Vinciarelli |
| 6,385,060 B1 | 5/2002 | Basso et al. |
| 2002/0128690 A1 | 9/2002 | Zarinetchi et al. |
| 2004/0145932 A1 | 7/2004 | Skeist et al. |
| 2006/0055384 A1* | 3/2006 | Jordan ............... H02M 3/158 323/282 |
| 2014/0098571 A1 | 4/2014 | Gaknoki et al. |

OTHER PUBLICATIONS

International Searching Authority, "Notification of Transmittal of the International Search Report and the Written Opinion of the International Searching Authority," dated Dec. 12, 2016 in International application No. PCT/US2016/053268.
Huang, Tzu-Chi, et al., "A Battery-Free 217 nW Static Control Power Buck Converter for Wireless RF Energy Harvesting With -Calibrated Dynamic On/Off Time and Adaptive Phase Lead Control,"IEEE Journal of Solid-State Circuits, vol. 47 No. 4, Apr. 2012, 11 pages.

* cited by examiner

*Primary Examiner* — Rexford N Barnie
*Assistant Examiner* — Dru Parries
(74) *Attorney, Agent, or Firm* — Trop, Pruner & Hu, P.C.

(57) ABSTRACT

In an embodiment, a system includes controller circuitry to initiate a plurality of energy transfer cycles. Each energy transfer cycle includes an input time period during which corresponding input energy is received by a power train, and an output time period during which corresponding output energy is output from the power train. The system also includes energy detection logic to provide, upon completion of each energy transfer cycle, a corresponding indication of corresponding residual energy retained by the power train. Other embodiments are described and claimed.

18 Claims, 4 Drawing Sheets

APPARATUS AND METHOD FOR REDUCED ENERGY RETENTION IN AN ENERGY TRANSFER SYSTEM

TECHNICAL FIELD

Embodiments pertain to reduced energy retention in an energy transfer system.

BACKGROUND

Systems such as energy harvesting systems may enable computing in a manner more diverse as compared to energy systems supplied by, e.g., an electrical grid, or a battery with a limited battery life. For example, energy harvesting systems may include one or more solar cells.

Many energy harvesting systems need DC-DC or AC-DC power conversion with very low control overhead to cater to their variable power nature and large dynamic range of transduced power. For example, solar cells change in output through the day with the sun and shadows cast on them. Portable applications experience even a larger variation. Low overhead control techniques and circuits are therefore important to successful energy harvesting for portable applications.

DETAILED DESCRIPTION

In order to collect and store energy from low power sources, e.g., solar cells, ultra-low power DC-DC or AC-DC systems may rely on discontinuous mode inductor-based power conversion (transformation) in various topologies. In embodiments, a low power energy detection circuit to detect residual energy in a power transformation circuit (e.g., power train) utilizes estimation and adaptation to achieve control performance without adding explicit voltage or current sensors to the power transformation, which avoids a need for gain circuitry and processing circuitry.

For example, a power train may receive energy from a solar cell and may output a portion of the received energy to an energy sink, e.g., storage device (e.g., battery, capacitor, etc.) or energy consuming device (e.g., resistive element, motor, or other consumer of energy). During a first time period $T_1$ (e.g., set by overall regulation), an input voltage from an input device may cause a circuit element, e.g., an inductor, of the power train to increase inductor current through the inductor at a slope given by $dI/dt=V_i/L$, where $V_i$ is an input voltage and L is an inductance of the inductor. After time $T_1$ is expired, the inductor may be connected across an output device, e.g., a battery, other energy storage device, or energy dissipation device.

Voltage across the output device may be higher than (or lower than) input voltage. When the inductor is coupled to the output device, the inductor current may ramp down while transferring energy to the output device. At a later time, a zero current may be achieved within the inductor. In embodiments, the time of zero current condition can be estimated based on detection of residual current and without use of a current sensor (e.g., a conducting loop and amplifying electronics) that can require significant power to operate. In other embodiments, an energy transfer system may employ one or more energy storage devices, (e.g., capacitors) to receive energy from an input device during a first time period $T_1$ and to output energy to an output device during a second time period $T_2$. At the end of $T_2$ a measurement of residual energy may be made (e.g., voltage measurement) via a low power sensor (e.g., comparator) and if residual energy is detected (e.g., above a lower detection threshold), the second time period $T_2$ may be adjusted (e.g., increased) in order to reduce residual energy in subsequent cycles.

Figure 1:
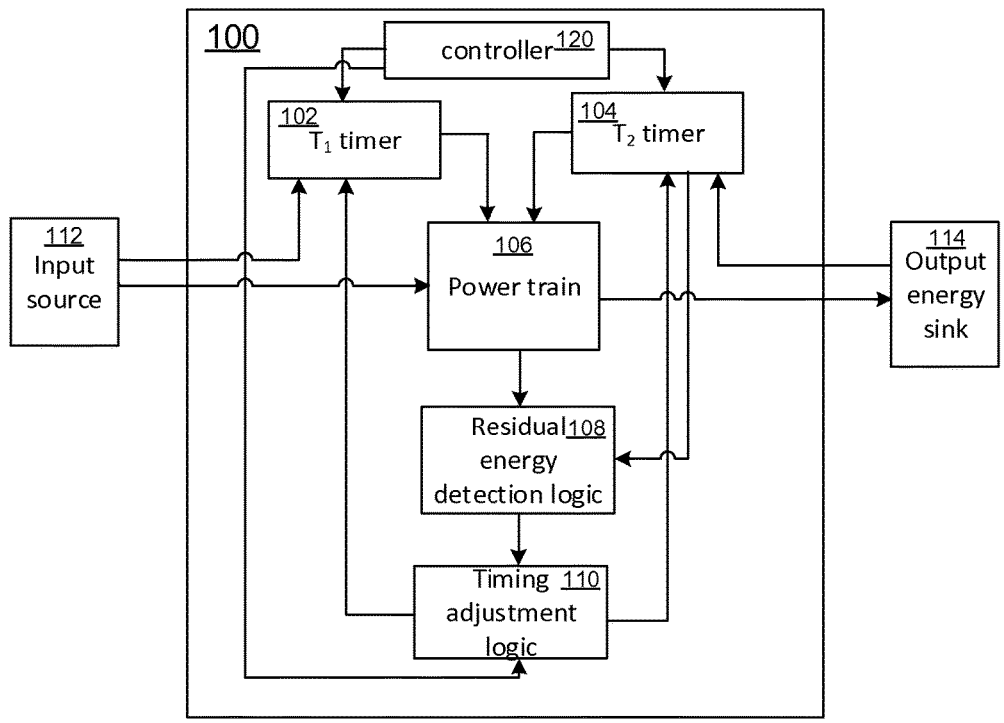
FIG. 1 is a block diagram of a system, according to embodiments of the present invention.

FIG. 1 is a block diagram of a system, according to embodiments of the present invention. System 100 includes a controller 120, a first timer 102, a second timer 104, a power train 106, residual energy detection logic 108, and timing adjustment logic 110.

In operation, controller 120 may initiate each of a plurality of cycles of energy transfer. During a first time period $T_1$ of a cycle an input source 112 (e.g., a photovoltaic cell) supplies energy to the power train 106. The first time period $T_1$ may be determined by the first timer 102. The power train 106 may store the energy received from the input source 112 in, e.g., an energy storage element such as an inductor. In other embodiments, a capacitor or other energy storage element may serve to store the received energy.

At the end of the first time period $T_1$, the input source 112 may be disconnected from the power train and an output energy sink 114 may be coupled to the power train. During a second time period $T_2$ the energy stored in the power train 106 may be transferred to the output energy sink 114 (e.g., battery, capacitor, or an energy dissipating device such as a resistor or other consumer of power), as an electric current from the power train 106 to the output energy sink 114. The second time period $T_2$ may be determined by the $T_2$ timer 104.

At the expiry of $T_2$, the output energy storage 114 may be decoupled from the power train 106. Also at the expiry of $T_2$, the residual energy detection logic 108 may detect residual energy stored in the power train 106, e.g., energy that remains in the power train 106 at the expiry of $T_2$. Responsive to detection of energy that remains in the power train 106 (e.g., current flowing through an inductor), the timing adjustment logic 110 may adjust $T_2$ to enable a more complete transfer of stored energy from the power train 106 to the output sink 114. Optionally, an increase in $T_2$ may be accompanied by an adjustment in $T_1$ (e.g., decrease). The energy detection logic 108 may be a low-power device, and hence detection of residual energy at $T_2$ may be accomplished with very little power expenditure.

The system 100 may adaptively react to residual energy in the power train 106. For example, residual energy may be detected and may result in adjustment of a timing capacitance in the $T_2$ timer 104.

In an embodiment, the energy detection logic 108 may include a latched comparator that may be clocked shortly after the expiry of $T_2$ and may measure voltage across a clamping device (e.g., a FET, not shown) coupled to a point in the power train 106 (e.g., an end of the inductor). The clamping device may include high resistance to damp ringing and the comparator can output a positive or negative voltage (e.g., associated with a direction of current flow in the inductor of the power train 106) that corresponds to the residual energy. Another option for a sense point is to use a switching node (e.g., a drain of FET 224 in FIG. 2).

The output of the latched comparator may indicate whether the current was positive or negative in error (and may optionally indicate a magnitude), which can be used to increment or decrement a counter/register that stores one or more timer parameters, e.g., capacitor adjustment value for the $T_2$ timer, and optionally another capacitor adjustment value for the $T_1$ timer 102.

Thus, at the end of each cycle $T_{cycle}$ (e.g., $T_{cycle}=T_1+T_2$), the residual energy detection logic 108 may detect residual energy in the power train 106 (e.g., corresponding to current detected in an inductor) and the timing adjustment logic 110 may adjust $T_2$ to reduce residual energy in a subsequent cycle, e.g., by adjustment of a variable capacitor in the $T_2$ timer 104, and optionally the timing adjustment logic 110 may also adjust $T_1$, e.g., by adjustment of a variable capacitor in the $T_1$ timer 102, responsive to an indication of residual energy in the power train 106 provided by the residual energy detection logic 108.

The timing adjustment logic 110 may adjust $T_2$ and may store a parameter corresponding to an adjusted $T_2$. If the input source 112 and the output sink 114 are essentially constant electrical voltage sources (e.g., constant input voltage and constant output voltage), execution of several cycles may, through successive approximation, produce an adjusted $T_2$ that reduces residual energy upon expiry of each $T_2$. If the input voltage is variable, $T_2$ may be varied in response (e.g., by successive approximation for each cycle) in order lower the residual energy in the power train.

The output energy sink 114 may provide voltage $V_o$ to the second timer 104. If $V_o$ fluctuates, the second timer 104 may adjust $T_2$ accordingly. Similarly, if input voltage $V_i$ varies, the first timer 102 may adjust $T_1$ in response. Either adjustment may occur while a cycle is in progress.

Figure 2:
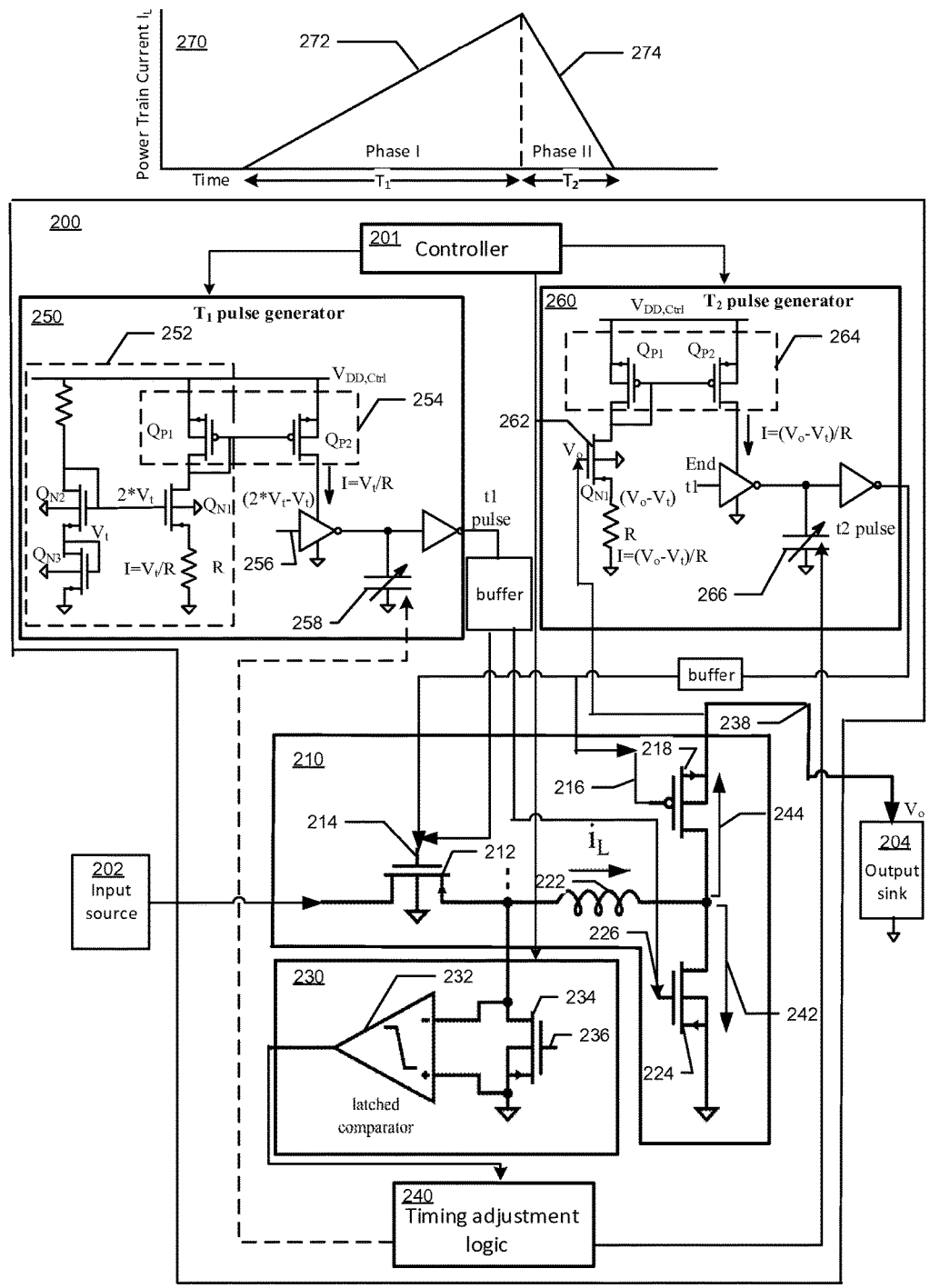
FIG. 2 is a block diagram of a system, according to an embodiment of the present invention.

FIG. 2 is a block diagram of a system, according to an embodiment of the present invention. System 200 is an energy transfer system that includes a controller 201, a power train 210, a $T_1$ pulse generator 250, a $T_2$ pulse generator 260, current detection logic (circuitry) 230, and timing adjustment logic 240.

In operation, the controller 201 initiates each cycle of the system 200, e.g., via a signal to an input 256 of an inverter within the $T_1$ pulse generator 250. As shown in graph 270, a cycle includes a phase I, e.g., energy transfer from an input source 202 to the power train 210 that occurs during a first time period $T_1$, and a phase II, e.g., energy transfer from power train 210 to an energy sink 204 that occurs during a second time period $T_2$.

During phase I, input source 202 provides energy to the power train 210. Within the power train 210, transistor 212 (e.g., field effect transistor (FET)) is activated (via gate 214) by a first pulse that originates at the $T_1$ pulse generator 250 and lasts for the time period $T_1$. The $T_1$ pulse generator 250 includes current mirrors 252 and 254 to provide current $I=V_t/R$ that charges capacitor 258, where $V_t$ is a threshold voltage of each FET within current mirrors 252 and 254. Capacitor 258 may be varied to vary the time period $T_1$.

During $T_1$, the first ($T_1$) pulse also activates gate 226 of FET 224 that enables current to flow from input source 202 through an inductor 222 and subsequently to ground, e.g., via a path whose direction is indicated by arrow 242. FET 218 is open during $T_1$, and therefore no current flows to output energy sink 204 during $T_1$. Current through the inductor 222 may increase linearly during $T_1$, as depicted by line 272 of graph 270 that illustrates power train current $I_L$ v. time.

When $T_1$ expires, $T_2$ begins with a second pulse that originates from the second pulse generator 260, the second pulse actuating FET 218 via gate 216. FET 224 is deactivated (e.g., gate 226 is turned off at the expiry of the $T_1$ pulse). Gate 214 may remain activated during phase II, allowing additional energy from the input source 202 to flow to the inductor 222. Current flows from the inductor 222 to the output energy sink 204 (indicated by arrow 244), and as represented by line 274 of the graph 270, the current may decrease linearly over the time period $T_2$.

$T_2$ may be varied by varying capacitor 266, which is charged by current $I=(V_o-V_t)/R$ that is output from current mirror 264 within the $T_2$ pulse generator 260. $V_o$ is the output voltage of the output energy sink 204, and $V_t$ is a threshold voltage of FET 262 in the $T_2$ pulse generator 260.

At the expiry of $T_2$, gates 214 and 216 are deactivated (FETs 212, 218, and 224 are opened) and gate 236 of FET 234 is activated, e.g., by the controller 201. A latched comparator 232 determines a voltage across the FET 234, which voltage may indicate residual energy in the inductor 222 (e.g., energy in the inductor $E_L=\frac{1}{2}(L)(I^2)$). A measurement by the comparator 232 may be made upon activation of the FET 234. An output of the comparator 232 may be input to timing adjustment logic 240, which can adjust capacitor 266 to change $T_2$ in order to reduce any residual energy that remains in the inductor 222 upon expiry of $T_2$. For example, a voltage polarization (e.g., positive or negative) of the comparator 232 (corresponding to direction of inductor current flow) can serve to indicate whether to increase $T_2$ or decrease $T_2$ in order to reduce residual energy. Optionally, the timing adjustment logic 240 can also change capacitor 258 in order to change $T_1$, (e.g., increase or decrease the energy input portion of the cycle) based on the output of the comparator 232.

Thus, through the use of the latched comparator 232, $T_2$ and/or $T_1$ may be changed after each transfer cycle to reduce residual energy within the inductor 222 after the transfer cycle is complete.

Additionally, the output voltage $V_o$ (of the energy sink 204) is continually fed back to the gate of FET 262, which can cause charging current of capacitor 266 to react to a change in $V_o$ ($I=(V_o-V_t)/R$), thus providing continual feedback for adjustment of $T_2$ due to output voltage fluctuations.

In another embodiment (not shown), the $T_1$ pulse generator 250 may be designed to receive the input voltage $V_i$ and to adjust $T_1$ (e.g., by adjustment of charging current to the capacitor 258) due to input voltage fluctuations.

Figure 3:
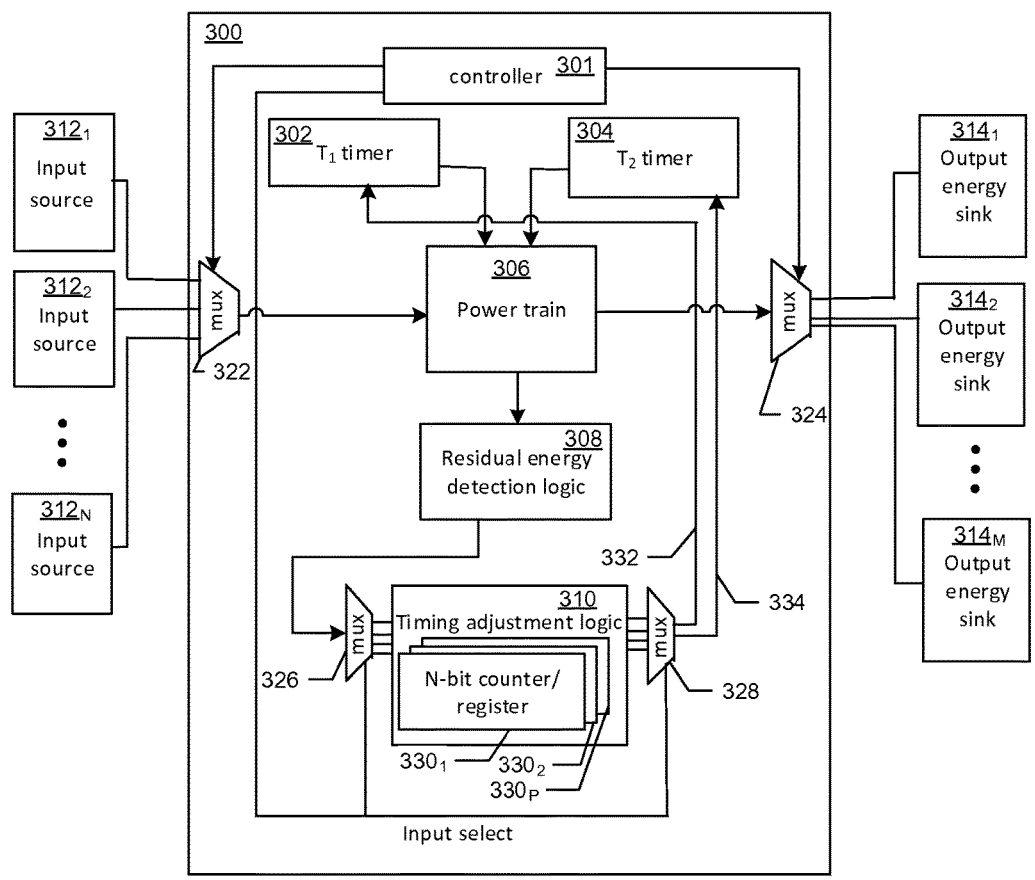
FIG. 3 is a block diagram of a system, according to another embodiment of the present invention.

FIG. 3 is a block diagram of a system, according to embodiments of the present invention. System 300 includes controller 301, $T_1$ timer 302, $T_2$ timer 304, power train 306, residual energy detection logic 308, timing adjustment logic 310, and multiplexers (mux) 322, 324, 326 and 328.

In operation, the controller 301 may select, via multiplexer 322, an input source $312_i$ (i is an integer to be selected, $1 \le i \le N$) from among input sources $312_1$-$312_N$ and the controller 301 may select, via multiplexer 324, an output energy sink $314_j$ (j is an integer to be selected, $1 \le j \le M$) from among output energy sinks $314_1$-$314_m$. (In other embodiments, instead of multiplexers 322 and 324 the power train 306 may include multiple input FETs, similar to FET 212 of FIG. 2, with each input FET to couple to a corresponding input source; also multiple output FETs, similar to FET 218 of FIG. 2, with each output FET to couple to a corresponding output source.)

The controller 301 also may select, via multiplexer 326, a register (e.g., counter/register) from among registers $330_1$-$330_P$ within or coupled to, the timing adjustment logic 310.

Each register $330_k$ (k is an integer to be selected $1 \leq k \leq P$) corresponds to a particular pair of input source and output energy sink. For instance, counter/register $330_1$ may be assigned to input source $312_1$/output energy sink $314_1$. Counter/register $330_2$ may be assigned to input energy source $312_1$/output energy sink $314_2$, etc. The controller 301 may also, via multiplexer 328, couple path 332 and path 334 to the selected counter register $330_k$ in order to set the $T_1$ timer 302 (e.g. set a capacitor value within the $T_1$ timer 302), and to set the $T_2$ timer 304 (e.g., set a capacitor value within the $T_2$ timer 304).

The controller 301 triggers each cycle of energy transfer that includes a $T_1$ portion when energy is input from the selected input source $312_i$ to the power train 306, and a $T_2$ portion when energy is output from the power train 306 to the selected output energy sink $314_j$. For each cycle, after the $T_2$ pulse expires the current detection logic 308 detects residual energy that remains in the power train 306. The timing adjustment logic 310 receives a value that corresponds to residual energy in the power train 306 at the expiry of $T_2$. The timing adjustment logic 310 sends a signal to $T_2$ timer 304 (e.g., via path 334) to adjust the time $T_2$ (e.g., to set a capacitor within the $T_2$ timer 304) in order to reduce the residual energy in power train 308 after $T_2$ expires in a subsequent cycle. In some embodiments, the timing adjustment logic 310 may also send a signal to the $T_1$ timer 302 (e.g., via path 332) to adjust time $T_1$ for a next cycle. Additionally, $T_2$ timer may respond to detected changes in output voltage of the output energy sink 314, e.g., resulting in adjustment of $T_2$.

The timing adjustment logic 310 may store values of adjusted parameters for $T_1$ and $T_2$ after each cycle, or may store the adjusted parameter values after all cycles are complete. The stored values of the adjusted parameters may be used to initialize the $T_1$ timer 302 and the $T_2$ timer 304 in a future energy transfer that involve the corresponding input source and output sink.

Thus, the system 300 of FIG. 3 monitors residual energy in the power train 306 for each cycle of energy supplied by input source $312_i$ followed by energy supplied to output energy sink $314_j$ and adjusts $T_2$ (and/or $T_1$) responsive to detection of residual energy in the power train 306 after $T_2$ expires. Additionally, parameters for the $T_1$ timer 302 and the $T_2$ timer 304 may be stored in a counter/register $330_k$ for initialization at a future time.

Further, the system 300 continually monitors output voltage $V_o$ and may adjust $T_2$ responsive to detection of a change in $V_o$.

The system 300 may monitor residual energy (e.g., current) in the power train 306 and output voltage $V_o$ of a selected pair of input source/output sink, and may maintain adjustment values with which to adjust $T_1$ and $T_2$ for each of the one or more pairs of input source/output sink. For example, the system 300 may receive energy supplied by a first selected input source and may provide the received energy to a first selected output energy sink in a first cycle and may store adjustment parameters in a first register of the timing adjustment logic 310. The system 300 may subsequently receive energy supplied by a second selected input source may provide the received energy to a second selected output energy sink in a second cycle and may store adjustment values in a second register of the timing adjustment logic 310. At a later time the system 300 may return to the first input source/output energy sink to again receive energy from the first input source and to output the energy to the first output sink, and may recall the adjustment parameters from the previous transfer of energy from the first input source to the first output energy sink, and set the $T_1$ timer 302 and $T_2$ timer 304 according to the stored adjustment parameters.

Setting the $T_1$ timer 302 and $T_2$ timer 304 according to the stored adjustment parameters can enable increased efficiency in transfer of energy between source and sink, e.g., when a change from a first source/sink pair to a second source/sink pair is effected, and later in time the system 300 returns to the first source/sink pair to carry out additional energy transfer between the first source/sink pair.

Figure 4:
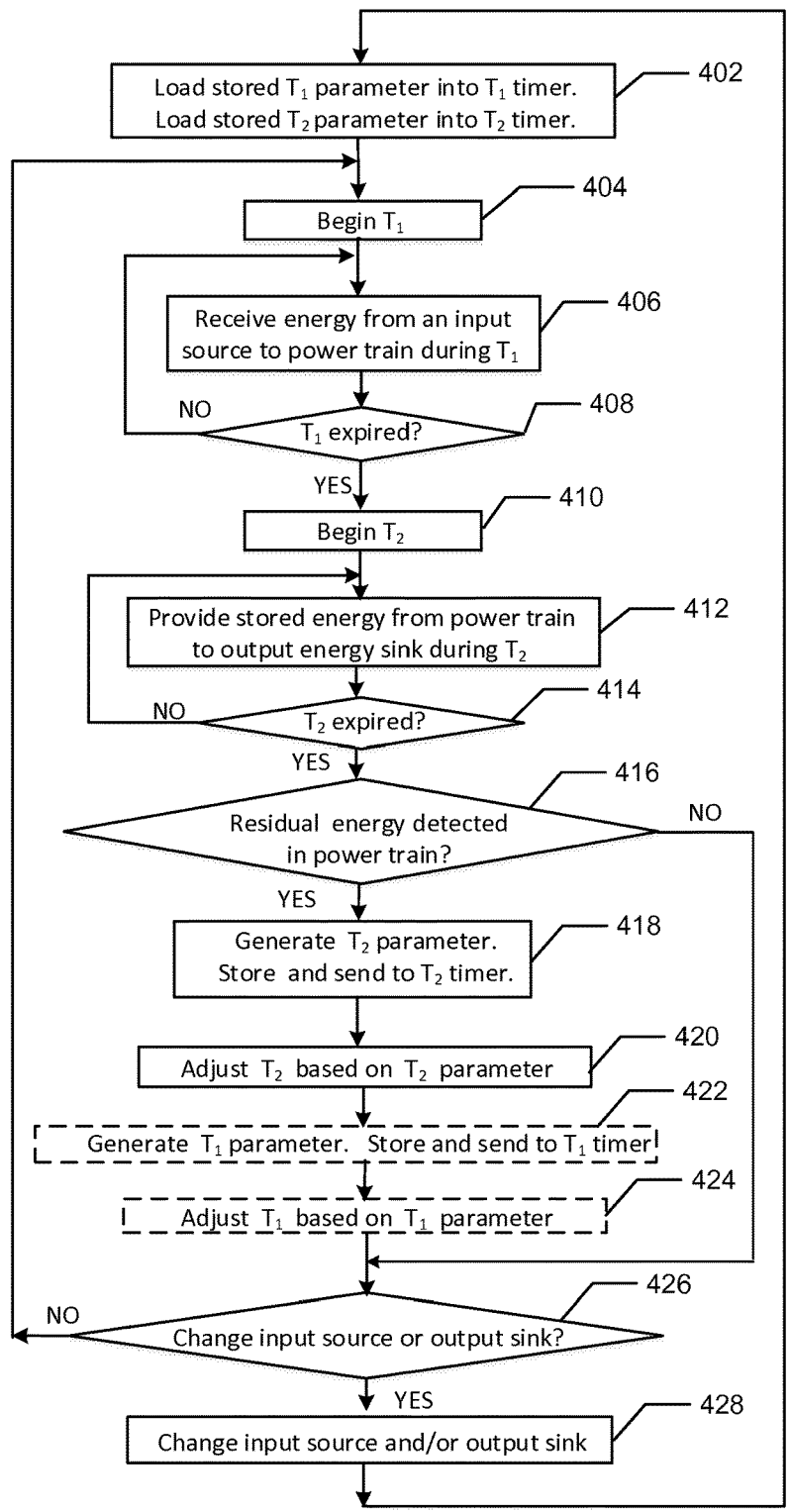
FIG. 4 is a flow diagram of a method, according to an embodiment of the present invention.

FIG. 4 is a flow diagram of a method, according to an embodiment of the present invention. Method 400 begins at block 402, where a stored $T_1$ parameter and a stored $T_2$ parameter are loaded into a $T_1$ timer and a $T_2$ timer, respectively. Continuing to block 404, the $T_1$ timer is started to begin a first time period $T_1$. Advancing to block 406, during $T_1$ energy is received by a power train from an input source (e.g., a solar cell or other electrical energy source). Moving to decision diamond 408, if $T_1$ has not expired, the method returns to block 406 and energy continues to be received from the input source. If, at decision diamond 408 $T_1$ has expired, the method continues to block 410 where a second time period $T_2$ commences.

Proceeding to block 412, during $T_2$ energy that is temporarily stored in the power train is output to an output energy sink. For example, electrical energy may be temporarily stored in an inductor within the power train, which may be output to an output storage such as a battery or a capacitor, or to a resistor or other energy utilization/dissipation device. Continuing to decision diamond 414, if $T_2$ is not expired the method returns to block 412.

If, at decision diamond 414 $T_2$ is expired, advancing to decision diamond 416, the method determines whether residual energy remains in the power train (e.g. detectable above a detection threshold), e.g., as current in an inductor. At decision diamond 416, if no residual energy is detected (e.g., the residual energy is lower than the detection threshold) the method jumps to decision diamond 426.

At decision diamond 426 if there is to be no change in selection of either the input source or the output sink, the method returns to block 404 to begin another cycle of receiving energy from the input source and subsequently providing energy to the output sink. If, at decision diamond 426, there is to be a change in selection of either the input source or the output sink, proceeding to block 428 the change is executed and returning to block 402, $T_1$ and $T_2$ parameters of the new input source/output sink are loaded into the $T_1$ timer and $T_2$ timer from storage (e.g., registers). The next cycle is then begun at block 404.

Back at decision diamond 416, if residual energy is detected in the power train at the expiry of $T_2$ (e.g., residual energy greater than the detection threshold), continuing to block 418 a $T_2$ parameter is generated (e.g., by parameter adjustment logic), stored and sent to the $T_2$ timer, and advancing to block 420 the $T_2$ timer is adjusted according to the new $T_2$ parameter. Optionally, at block 422, a $T_1$ parameter is generated, stored and sent to the $T_1$ timer, and continuing to block 424, $T_1$ is adjusted in the $T_1$ timer based on the $T_1$ parameter.

Advancing to decision diamond 426, if there is to be no change in selection of either the input source or the output sink, the method returns to block 404 and a next cycle begins. If there is to be a change in input source or output sink, moving to block 428 the change in input source and/or output sink is executed, and returning to block 402 stored values of the $T_1$ parameter and the $T_2$ parameter are loaded into the $T_1$ timer and $T_2$ timer, respectively.

Additional embodiments are described below.

A first embodiment is a system that includes controller circuitry to initiate a plurality of energy transfer cycles, where each energy transfer cycle includes an input time period during which corresponding input energy is received by a power train and an output time period during which corresponding output energy is output from the power train. The system also includes energy detection logic to provide, upon completion of each energy transfer cycle, a corresponding indication of corresponding residual energy retained by the power train.

A $2^{nd}$ embodiment includes elements of the $1^{st}$ embodiment, further including timing adjustment logic to adjust the output time period after each transfer cycle responsive to the corresponding indication.

A $3^{rd}$ embodiment includes elements of the $2^{nd}$ embodiment, where each indication corresponds to a direction of current flow in the power train.

A $4^{th}$ embodiment includes elements of the $1^{st}$ embodiment, and further includes timing adjustment logic to adjust the input time period after completion of each transfer cycle based on the corresponding indication.

A $5^{th}$ embodiment includes elements of the $1^{st}$ embodiment, where the energy detection logic includes current detection logic to detect a residual current in the power train, where the residual current corresponds to the corresponding residual energy.

A $6^{th}$ embodiment includes elements of the $2^{nd}$ embodiment, where the power train is to receive the input energy from an input device that is a selectable one of a plurality of input devices, where the timing adjustment logic is to store, for each input device, a corresponding input timing parameter and a corresponding output timing parameter, and where responsive to a selection of the input device, the timing adjustment logic is to, prior to commencement of the energy transfer cycles, set the input time period based upon the corresponding input timing parameter that is stored and set the output time period based on the corresponding output timing parameter that is stored.

A $7^{th}$ embodiment includes elements of the $6^{th}$ embodiment, where the power train is to output the output energy to a selectable one of a plurality of output devices, where the timing adjustment logic is to store, for each of a plurality of device pairs that include a corresponding input device and a corresponding output device, a corresponding device pair input timing parameter and a corresponding device pair output timing parameter, and where responsive to a selection of a particular device pair the timing adjustment logic is to, prior to commencement of the energy transfer cycles, set the input time period based upon the corresponding device pair input timing parameter and set the output time period based on the corresponding device pair output timing parameter.

An $8^{th}$ embodiment includes elements of any one of embodiments 1 to 7, further including output timing logic to monitor an output voltage of an output device that is to receive the corresponding output energy and to adjust the output time period responsive to a change in the output voltage.

A $9^{th}$ embodiment is a method including determining, by monitoring and adjustment circuitry for each of a plurality of energy transfer cycles, a corresponding measurement associated with residual energy in a power train upon completion of the energy transfer cycle, where each energy transfer cycle includes a respective energy input time period during which a respective input energy is received by the power train and a respective energy output time period during which a respective output energy is output from the power train, and adjusting, by the monitoring and adjustment circuitry upon completion of each energy transfer cycle and prior to commencement of an immediately next energy transfer cycle, the respective energy output time period based on the measurement.

A $10^{th}$ embodiment includes elements of the $9^{th}$ embodiment, further including adjusting, by the monitoring and adjustment circuitry upon the completion of each energy transfer cycle and prior to commencement of the immediately next energy transfer cycle, the respective energy input time period based on the measurement.

An $11^{th}$ embodiment includes elements of the $9^{th}$ embodiment, further including prior to commencement of the plurality of energy transfer cycles, determining the energy input time period and the energy output time period based on an energy input time period parameter and an energy output time period that are stored and are associated with an input device that is to supply input energy for each energy transfer cycle of the plurality of energy transfer cycles.

A $12^{th}$ embodiment includes elements of the $11^{th}$ embodiment, further including storing, for each of a plurality of pairs wherein each pair includes a corresponding input device and a corresponding output device, corresponding time period parameters including a corresponding energy input time period parameter and a corresponding energy output time period parameter, selecting a particular pair for the plurality of energy cycles, and determining prior to commencement of the plurality of energy transfer cycles the energy input time period and the energy output time period for the particular pair based on the corresponding time period parameters that are stored.

A $13^{th}$ embodiment includes elements of the $9^{th}$ embodiment, further including monitoring an output voltage during execution of the plurality of energy transfer cycles and adjusting the energy output time period responsive to a change in the output voltage.

A $14^{th}$ embodiment is an apparatus including means for performing the method of any one of embodiments 9 to 13.

A $15^{th}$ embodiment is an apparatus to perform the method of any one of embodiments 9 to 13.

A $16^{th}$ embodiment is a machine readable medium having stored thereon instructions, which if performed by a machine cause the machine to perform a method that includes: monitoring an output voltage of an output device during execution of a plurality of energy transfer cycles by a power train, wherein each energy transfer cycle includes an energy input time period during which input energy is to be received from an input device and an energy output time period during which output energy is to be output to the output device; and adjusting the energy output time period responsive to a change in the output voltage of the output device.

A $17^{th}$ embodiment includes elements of the $16^{th}$ embodiment, where the method further includes determining, for each energy transfer cycle, a corresponding measurement associated with residual energy in the power train upon completion of the energy transfer cycle, and adjusting, upon completion of each energy transfer cycle of the plurality of energy transfer cycles, the energy output time period responsive to a difference between a measurement determined upon completion of the energy transfer cycle and a previous measurement determined upon completion of an immediately preceding energy transfer cycle of the plurality of energy transfer cycles.

A $18^{th}$ embodiment includes elements of the $17^{th}$ embodiment, where the method further includes adjusting, upon completion of each energy transfer cycle, the energy input time period responsive to a difference between the first measurement and the second measurement.

An 19$^{th}$ embodiment includes elements of the 17$^{th}$ embodiment, where each measurement is to be determined via circuitry that includes a comparator.

A 20$^{th}$ embodiment includes elements of the 16$^{th}$ embodiment, where the method further includes prior to commencement of the plurality of energy transfer cycles, determining the energy input time period and the energy output time period based on an energy input time period parameter and an energy output time period that are stored and are associated with the input device.

A 21$^{th}$ embodiment includes elements of any one of embodiments 16 to 20, where the method further includes retrieving from storage, for a selected pair of devices that includes a selected input device and a selected output device, an energy input time period parameter and an energy output time period parameter, and determining prior to commencement of the plurality of energy transfer cycles the energy input time period based on the energy input time period parameter and the energy output time period based on the energy output time period parameter.

A 22$^{st}$ embodiment includes elements of the 21$^{th}$ embodiment, where the method further includes determining, for each energy transfer cycle, a corresponding measurement associated with residual energy in the power train upon completion of the energy transfer cycle, adjusting, after the completion of each energy transfer cycle, the energy output time period based on the corresponding measurement, and upon completion of the plurality of transfer cycles, determining an updated energy output time period parameter based on the energy output time period after adjustment and replacing in storage the energy output time period parameter by the updated energy output time period parameter.

A 23$^{nd}$ embodiment is a method that includes monitoring an output voltage of an output device during execution of a plurality of energy transfer cycles by a power train, where each energy transfer cycle includes an energy input time period during which input energy is to be received from an input device and an energy output time period during which output energy is to be output to the output device, and adjusting the energy output time period responsive to a change in the output voltage of the output device.

A 24$^{rd}$ embodiment includes elements of the 23$^{nd}$ embodiment, where the method further includes: determining, for each energy transfer cycle, a corresponding measurement associated with residual energy in the power train upon completion of the energy transfer cycle; and adjusting, upon completion of each energy transfer cycle of the plurality of energy transfer cycles, the energy output time period responsive to a difference between a measurement determined upon completion of the energy transfer cycle and a previous measurement determined upon completion of an immediately preceding energy transfer cycle of the plurality of energy transfer cycles.

A 25$^{th}$ embodiment includes elements of the 24$^{rd}$ embodiment, where the method further includes adjusting, upon completion of each energy transfer cycle, the energy input time period responsive to a difference between the first measurement and the second measurement.

A 26$^{th}$ embodiment includes elements of the 25$^{th}$ embodiment, where each measurement is to be determined via circuitry that includes a comparator.

A 27$^{th}$ embodiment includes elements of the 23$^{nd}$ embodiment, where the method further includes prior to commencement of the plurality of energy transfer cycles, determining the energy input time period and the energy output time period based on an energy input time period parameter and an energy output time period that are stored and are associated with the input device.

A 28$^{th}$ embodiment includes elements of the 23$^{nd}$ embodiment, where the method further includes retrieving from storage, for a selected pair of devices that includes a selected input device and a selected output device, an energy input time period parameter and an energy output time period parameter, and determining prior to commencement of the plurality of energy transfer cycles the energy input time period based on the energy input time period parameter and the energy output time period based on the energy output time period parameter.

A 29$^{th}$ embodiment includes elements of the 28$^{th}$ embodiment, where the method further includes determining, for each energy transfer cycle, a corresponding measurement associated with residual energy in the power train upon completion of the energy transfer cycle, adjusting, after the completion of each energy transfer cycle, the energy output time period based on the corresponding measurement, and upon completion of the plurality of transfer cycles, determining an updated energy output time period parameter based on the energy output time period after adjustment and replacing in storage the energy output time period parameter by the updated energy output time period parameter.

A 30$^{th}$ embodiment is an apparatus including means for performing the method of any one of embodiments 23 to 29.

A 31$^{th}$ embodiment is an apparatus to perform the method of any one of embodiments 23 to 29.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
controller circuitry to initiate a plurality of energy transfer cycles, wherein each energy transfer cycle includes an input time period during which corresponding input energy is received by a power train and an output time period during which corresponding output energy is output from the power train;
energy detection logic to provide, upon completion of each energy transfer cycle, a corresponding indication of corresponding residual energy retained by the power train; and
output timing logic to monitor an output voltage of an output device that is to receive the corresponding output energy and to adjust the output time period responsive to a change in the output voltage.

2. The system of claim 1, further comprising timing adjustment logic to adjust the output time period after each transfer cycle responsive to the corresponding indication.

3. The system of claim 2, wherein each indication corresponds to a direction of current flow in the power train.

4. The system of claim 1, further comprising timing adjustment logic to adjust the input time period after completion of each transfer cycle based on the corresponding indication.

5. The system of claim 1, wherein the energy detection logic includes current detection logic to detect a residual current in the power train, wherein the residual current corresponds to the corresponding residual energy.

6. The system of claim 2, wherein the power train is to receive the input energy from an input device that is a selectable one of a plurality of input devices, wherein the timing adjustment logic is to store, for each input device, a corresponding input timing parameter and a corresponding output timing parameter, and wherein responsive to a selection of the input device, the timing adjustment logic is to, prior to commencement of the energy transfer cycles, set the input time period based upon the corresponding input timing parameter that is stored and set the output time period based on the corresponding output timing parameter that is stored.

7. The system of claim 6, wherein the power train is to output the output energy to a selectable one of a plurality of output devices, wherein the timing adjustment logic is to store, for each of a plurality of device pairs that include a corresponding input device and a corresponding output device, a corresponding device pair input timing parameter and a corresponding device pair output timing parameter, and wherein responsive to a selection of a particular device pair the timing adjustment logic is to, prior to commencement of the energy transfer cycles, set the input time period based upon the corresponding device pair input timing parameter and set the output time period based on the corresponding device pair output timing parameter.

8. A method comprising:
determining, by monitoring and adjustment circuitry for each of a plurality of energy transfer cycles, a corresponding measurement associated with residual energy in a power train upon completion of the energy transfer cycle, wherein each energy transfer cycle includes a respective energy input time period during which a respective input energy is received by the power train and a respective energy output time period during which a respective output energy is output from the power train;
adjusting, by the monitoring and adjustment circuitry upon completion of each energy transfer cycle and prior to commencement of an immediately next energy transfer cycle, the respective energy output time period based on the measurement; and
prior to commencement of the plurality of energy transfer cycles, determining the energy input time period and the energy output time period based on an energy input time period parameter and an energy output time period parameter that are stored and are associated with an input device that is to supply input energy for each energy transfer cycle of the plurality of energy transfer cycles.

9. The method of claim 8, further comprising adjusting, by the monitoring and adjustment circuitry upon the completion of each energy transfer cycle and prior to commencement of the immediately next energy transfer cycle, the respective energy input time period based on the measurement.

10. The method of claim 8, further comprising storing, for each of a plurality of pairs wherein each pair includes a corresponding input device and a corresponding output device, corresponding time period parameters including a corresponding energy input time period parameter and a corresponding energy output time period parameter, selecting a particular pair for the plurality of energy transfer cycles, and determining prior to commencement of the plurality of energy transfer cycles the energy input time period and the energy output time period for the particular pair based on the corresponding time period parameters that are stored.

11. The method of claim 8, further comprising monitoring an output voltage during execution of the plurality of energy transfer cycles and adjusting the energy output time period responsive to a change in the output voltage.

12. A machine readable medium having stored thereon instructions, which if performed by a machine cause the machine to perform a method comprising:
monitoring an output voltage of an output device during execution of a plurality of energy transfer cycles by a power train, wherein each energy transfer cycle includes an energy input time period during which input energy is to be received from an input device and an energy output time period during which output energy is to be output to the output device; and
adjusting the energy output time period responsive to a change in the output voltage of the output device.

13. The machine readable medium of claim 12, wherein the method further comprises:
determining, for each energy transfer cycle, a corresponding measurement associated with residual energy in the power train upon completion of the energy transfer cycle; and
adjusting, upon completion of each energy transfer cycle of the plurality of energy transfer cycles, the energy output time period responsive to a difference between a measurement determined upon completion of the energy transfer cycle and a previous measurement determined upon completion of an immediately preceding energy transfer cycle of the plurality of energy transfer cycles.

14. The machine readable medium of claim 13, wherein the method further comprises adjusting, upon completion of each energy transfer cycle, the energy input time period responsive to a difference between the first measurement and the second measurement.

15. The machine readable medium of claim 13, wherein each measurement is to be determined via circuitry that includes a comparator.

16. The machine readable medium of claim 12, wherein the method further comprises prior to commencement of the plurality of energy transfer cycles, determining the energy input time period and the energy output time period based on an energy input time period parameter and an energy output time period parameter that are stored and are associated with the input device.

17. The machine readable medium of claim 12, wherein the method further comprises retrieving from storage, for a selected pair of devices that includes a selected input device and a selected output device, an energy input time period parameter and an energy output time period parameter, and determining prior to commencement of the plurality of energy transfer cycles the energy input time period based on the energy input time period parameter and the energy output time period based on the energy output time period parameter.

18. The machine readable medium of claim 17, wherein the method further comprises:
   determining, for each energy transfer cycle, a corresponding measurement associated with residual energy in the power train upon completion of the energy transfer cycle;
   adjusting, after the completion of each energy transfer cycle, the energy output time period based on the corresponding measurement; and
   upon completion of the plurality of energy transfer cycles, determining an updated energy output time period parameter based on the energy output time period after adjustment and replacing in storage the energy output time period parameter by the updated energy output time period parameter.

\* \* \* \* \*